Figure 1:
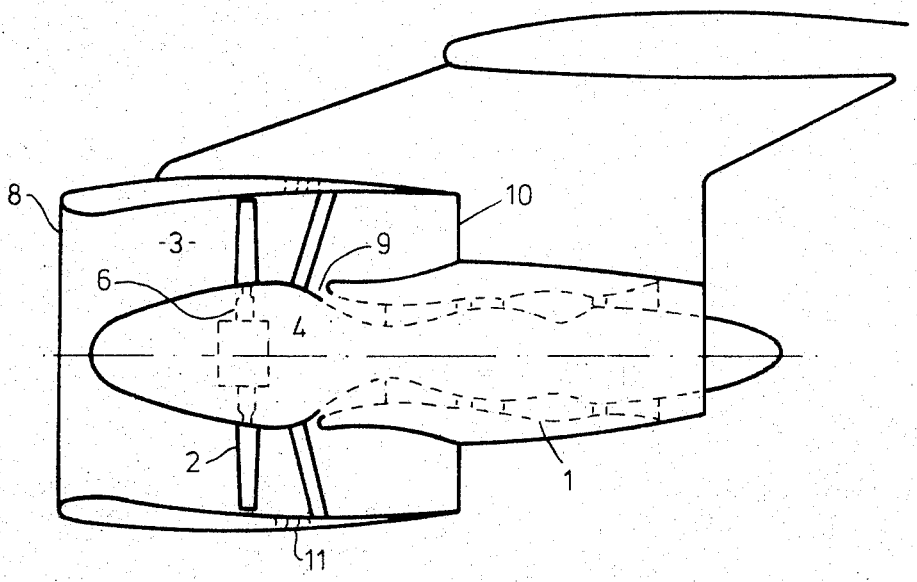

United States Patent [19]

Denning et al.

[11] 3,729,934
[45] May 1, 1973

[54] GAS TURBINE ENGINES

[75] Inventors: Ralph Murch Denning; Reginald Harold Wiltshire; Clifford Stanley Woodward, all of Bristol, England

[73] Assignee: Secretary of State for Defence in Her Britannic Majesty's Government of the United Kingdom of Great Britain & Northern Ireland, London, England

[22] Filed: Nov. 8, 1971

[21] Appl. No.: 196,662

[30] Foreign Application Priority Data

Nov. 19, 1970 Great Britain..................54966/70

[52] U.S. Cl..............................60/226 R, 415/130
[51] Int. Cl..............................................F02k 3/04
[58] Field of Search............................60/226 R, 229; 415/130

[56] References Cited

UNITED STATES PATENTS

| | | | |
|---|---|---|---|
| 3,476,486 | 11/1969 | Davies | 60/226 R |
| 3,489,338 | 1/1970 | Chilman | 60/226 R |
| 3,660,981 | 5/1972 | Stevens | 60/226 R |

Primary Examiner—Douglas Hart
Attorney—Richard K. Stevens et al.

[57] ABSTRACT

A turbo-fan engine having four blades capable of being turned from a forward thrust-producing position to a reverse thrust position, also includes means for biassing the flow through the fan in the reverse thrust mode of operation towards the engine axis, to reduce the base drag due to low pressure air on the engine axis, and to prevent attachment of the flow to the fan intake lip.

5 Claims, 3 Drawing Figures

GAS TURBINE ENGINES

The present invention relates to gas turbine jet propulsion engines which have ducted front fans, the individual fan blades of which are rotable about their longitudinal axes, from a forward thrust-producing mode of operation to a reverse thrust-producing mode of operation.

These fans are normally designed to give maximum efficiency during the forward thrust producing mode of operation and it has been found that when the fan blades are turned to the reverse thrust mode of operation the amount of thrust produced by the fan is reduced.

One reason for the reduction of thrust in the reverse pitch mode of operation is that the roots of the blade do very little work on the air passing through the fan so that there is very little rise in pressure in the air across the roots of the blades. The low pressure/low velocity flow adjacent the inner wall of the fan duct mixes with the high velocity flow from the middle portions of the fan blades and sets up a recirculatory zone adjacent the inner wall. This recirculation tends to act as a base drag which reduces the effect of the reverse thrust produced by the higher pressure air from the middle parts of the fan blades by producing a region of low pressure air adjacent the axis of the engine. This effect becomes more and more pronounced with cowls which extend further and further forwards from the fan.

A further loss of reverse thrust is also produced particularly under forward movement of an aircraft in which the engine is used, by the air emerging from the forward end of the fan duct attaching itself to the lip of the fan duct, and spreading round the lip until it breaks away, with a component of velocity at right angles to the engine axis, and possibly even a component of velocity rearwards of the engine.

The present invention has for its object, the reduction of thrust loss due to these two phenomena.

According to the present invention therefore a gas turbine jet propulsion engine comprises a gas generator driving a fan mounted in a duct, wherein the individual fan blades of the fan are rotatable about their longitudinal axes from a forward thrust-producing position to a reverse thrust-producing position, and is characterised by means, operable when the fan blades are in the reverse thrust-producing position, for biassing the air flow emerging from the forward end of the fan duct towards the engine axis.

The means for biassing the air flow may comprise means for admitting air under pressure into the duct adjacent at least one wall of the duct, or may comprise flap means for deflecting the flow through the duct towards the engine axis.

The means for biassing the air flow towards the engine axis may comprise, additionally or alternatively, means for ejecting air under pressure from the lip of the fan duct, or even means for ejecting air with a forwardly directed component of velocity from the outer surface of the fan duct thus preventing said attachment of air flow to the lip of the fan duct.

Thus in a preferred embodiment, air is bled from a compressor of the gas generator during the reverse thrust mode of operation, fed through ducting to the fan duct wall, and passed through apertures in the fan duct wall into the air stream which has passed through the fan.

Figure 2:
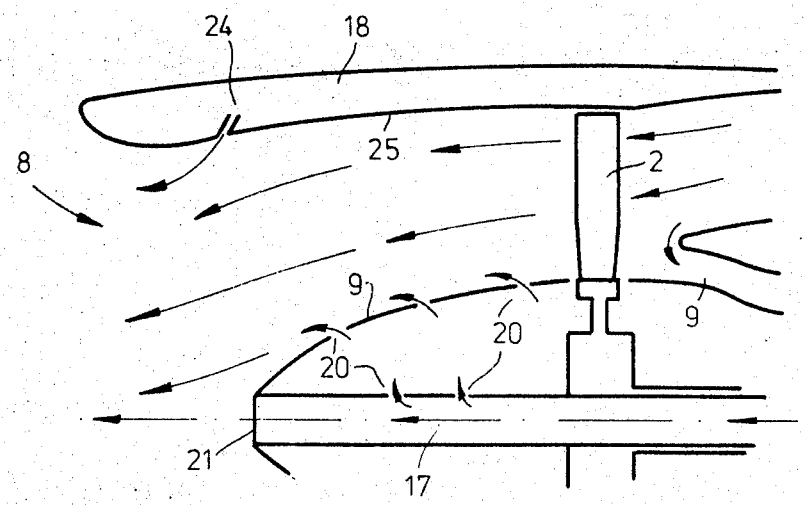
Figure 3:
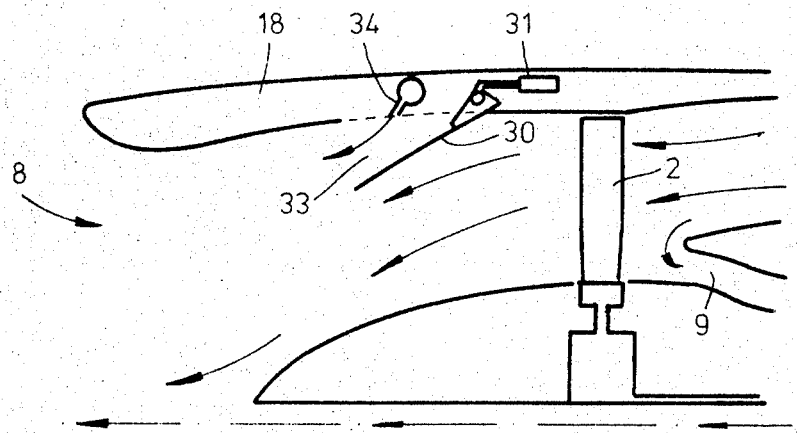

The invention will now be described in more detail, merely by way of examples, with reference to the accompanying drawings in which:

FIG. 1 shows diagrammatically a ducted fan gas turbine jet propulsion engine having a fan with reversible pitch blades, FIG. 2 illustrated an embodiment in which the biassing of the flow is achieved by admitting air under pressure to the fan duct of the engine adjacent both inner and outer walls of the fan duct, and FIG. 3 illustrates one alternative arrangement in which a combination of air pressure and mechanical means is used, to achieve said biassing of the flow.

Referring now to the drawings, there is shown in FIG. 1 a ducted fan gas turbine jet propulsion engine having a gas generator 1 which is arranged to drive a fan 2, disposed within an annular fan duct 3, through a reduction gear box 4. The gas generator may be of any suitable known type since the type of gas generator is not an essential part of the invention. It may therefore comprise, for example, two compressors in flow series mounted on separate shafts and each driven by separate turbines, the fan being driven by means of a shaft extending forwardly from the lower pressure of the two compressors into the reduction gear box.

The individual blades of the fan are rotatable about their longitudinal axes to vary their angle of attack so that they can move from a forward thrust-producing position to a reverse thrust-producing position. The rotation is achieved by means of a fan pitch control unit 6 which is not described in detail since the details are not relevant to the present invention.

In the forward thrust mode of operation of the engine, i.e., when the fan blades are in their forward thrust-producing position, air enters the fan duct 3 through a forwardly-facing air intake 8, part of the air entering the gas generator through a gas generator air inlet 9, the remainder passing to atmosphere through a rearwardly-facing propulsion nozzle 10. In the reverse thrust mode of operation, however, the fan draws in air through the rearwardly pointing nozzle 10, some of which passes into the gas generator air inlet 9, the remainder passing to atmosphere through the air intake 8. An auxiliary fan air inlet 11 may be provided to increase the air inlet area to the fan in the reverse thrust mode of operation.

Due, inter alia, to the smaller radius of the root portion of the fan blade, the root of the blade does little work on the air flowing through the fan duct so the pressure of air adjacent the inner wall of the fan duct, after passing through the fan, is lower than the pressure of the air in the centre of the duct. This can lead in the reverse thrust made of operation of the engine to a stagnant recirculatory zone of air being set up over the inner wall of the fan duct and on the engine axis forward of the nose cone which forms the inner wall of the duct. This is due to the fact that the area of the duct 3 is increasing.

The zone of low pressure thus produced over the inner wall of the fan duct acts effectively as a base drag in the reverse thrust mode.

In addition, partly due to the increasing area of the fan duct, and to the fact that the lip of the fan duct outer wall is designed with large radius corners to act as an efficient intake, the fan flow can attach itself to the lip of the duct.

This is a particular problem when the aircraft has any appreciable forward speed because, once the flow has turned through a few degrees and has a component of velocity at right angle to the engine axis, the air flow over the outside of the cowl due to the forward movement of the aircraft turns the flow from the fan still more, so that by the time the flow breaks away from the outer wall of the fan duct it may even have a component of velocity rearwards, which is directly offset against the reverse thrust produced by the fan.

In order to remove these effects the flow distribution, i.e., the pressure and velocity profiles, across the duct must be changed to bias the high pressure part of the flow towards the engine axis thus filling the base drag and preventing said flow attachment. Several alternative methods may be used for changing the flow distribution using air bled from an engine compressor, mechanical deflectors or a combination of both.

FIG. 2 shows in more detail one method in which air bled from an engine compressor is fed into the fan air stream. The air is fed from the compressor via a valve (not shown) into a central duct 17, and into the outer cowl 18.

From the central duct 17 the air is fed through apertures 20 into the fan air flow adjacent the inner wall 9 of the fan duct, i.e., the nose bullet of the engine, and through a central aperture 21 into the fan air stream from the central portion of the nose bullet.

From the outer cowl 18, the air is fed through a plurality of angularly spaced apart apertures 24 into the fan air stream adjacent the outer wall 25 of the fan duct.

The effect of the air bleed into the fan duct adjacent the inner duct wall, increases the pressure of the fan air adjacent the wall, and pulls the fan flow towards the axis of the engine thus filling in the base drag and effectively increasing the efficiency of the fan.

The effect of the air bled from the outer cowl will be to move the fan air flow radially across the duct towards the nose bullet to some extent thus causing the flow to tend to adhere to the surface of the nose bullet and preventing the attachment of the flow to the lip of the fan duct.

This effect can be greatly enhanced by the use of mechanical means, for example, a ring of flaps as shown in FIG. 3.

Referring now to FIG. 3, a ring of flaps 30 is provided, which are disposed on the radially inner wall of the outer cowl 18 between the fan and the intake 8. The flaps are pivotably mounted from the cowl at their rearward ends and means 31 are provided for moving the flaps from a stowed position in which they lie flush with the inner surface of the outer cowl, when the engine is in the forward thrust mode of operation, to an operative position, in which they extend into the fan flow, when the engine is in the reverse thrust mode of operation.

The object of the flaps is to direct the fan air flow towards the inner wall of the fan duct, i.e., towards the engine axis so that the flow will attach itself to the inner wall and eliminate the low pressure zone adjacent the wall.

The use of flaps for this purpose as shown in FIG. 3 produces a stagnation zone 33 behind the flaps which may be filled in with air bled from an engine compressor through apertures.

In addition air may also be fed from a compressor to the surface of the nose bullet as described in relation to FIG. 2 but in this case the admission of air into the fan air flow may be restricted to the forward end of the nose bullet where the fan air flow is most likely to break away from the nose bullet surface.

It may be found in operation that an air bleed into the fan duct adjacent the outer wall thereof will not be successful in preventing flow attachment, and thus further apertures may be provided, either on the lip of the duct itself, or on the outer surface of the duct wall, so that air may be ejected with a forwardly directed component of velocity from these apertures. This will have the effect of turning any flow tending to become attached to the cowl lip, back towards the axis of the engine and encouraging break away of the flow from the internal surface of the fan duct wall just rearwardly of the lip of the fan duct.

In the reverse thrust mode of operation of the fan, the work done by the fan is less than in the forward thrust mode of operation so that under maximum throttle, the turbine which drives the fan will tend to overspeed. Because of this it may be necessary to bleed the compressor of the gas generator to reduce the mass flow of hot gases entering the fan-driving turbine. An air bleed is available therefore from one of the compressors of the gas generator in the reverse thrust mode of operation of the fan which may be used for the purposes described above. The bleed is controlled by means of a valve operable in the reverse thrust mode of operation of the fan.

Further valve means may be provided, if required, for regulating the pressure of the air bled into the fan duct to avoid air at too high a pressure adversely affecting the fan flow in the duct.

We claim:

1. A gas turbine jet propulsion engine comprising a gas generator, a fan including a ring of fan blades, an annular duct, means mounting the fan for operation in the duct and shafting by means of which the fan is driven from the gas generator, the fan blades being individually rotatable about their longitudinal axes from a forward thrust-producing position to a reverse thrust producing-position, and wherein the improvement comprises means, operable when the fan blades are in the reverse thrust-producing position, for biassing the air flow emerging forwardly from the fan towards the axis of the engine.

2. A gas turbine engine according to claim 1 and wherein the means for biassing said air flow towards the axis of the engine comprises means for ejecting air under pressure from at least one wall of the duct.

3. A gas turbine engine according to claim 2 and wherein the air under pressure is admitted into the duct through apertures in said at least one wall of the duct.

4. A gas turbine engine according to claim 1 and wherein the means for biassing the air flow from the fan towards the axis of the engine comprises a flap, a pivot by which the flap is pivotably mounted at its rearward end to the internal surface of the outer wall of the duct, said flap forming part of said surface during the forward thrust mode of operation of the fan, but which lies obliquely of the air flow in the duct during the reverse thrust mode of operation of the fan, and deflects said air flow towards the axis of the engine.

5. A gas turbine engine according to claim 4 and wherein means are additionally provided for admitting air under pressure through apertures in one or both of the walls of the duct.

* * * * *